US011038917B2

(12) United States Patent
Kupreev et al.

(10) Patent No.: US 11,038,917 B2
(45) Date of Patent: *Jun. 15, 2021

(54) SYSTEM AND METHODS FOR BUILDING STATISTICAL MODELS OF MALICIOUS ELEMENTS OF WEB PAGES

(71) Applicant: AO Kaspersky Lab, Moscow (RU)

(72) Inventors: Oleg V. Kupreev, Moscow (RU);
Anton B. Galchenko, Moscow (RU);
Mikhail V. Ustinov, Moscow (RU);
Vitaly V. Kondratov, Moscow (RU);
Vladimir A. Kuskov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,316

(22) Filed: Nov. 1, 2019

(65) Prior Publication Data
US 2020/0092305 A1  Mar. 19, 2020

Related U.S. Application Data

(63) Continuation of application No. 15/475,885, filed on Mar. 31, 2017, now Pat. No. 10,505,973.

(30) Foreign Application Priority Data

Oct. 10, 2016  (RU) ........................ RU2016139468

(51) Int. Cl.
*H04L 29/06* (2006.01)
(52) U.S. Cl.
CPC ........ *H04L 63/145* (2013.01); *H04L 63/1483* (2013.01); *H04L 63/168* (2013.01)

(58) Field of Classification Search
None
See application file for complete search history.

(56) References Cited

U.S. PATENT DOCUMENTS

| 6,611,925 | B1 | 8/2003 | Spear |
| 7,058,626 | B1 | 6/2006 | Pan |

(Continued)

FOREIGN PATENT DOCUMENTS

| EP | 2199940 A2 | 6/2010 |
| JP | 2000137732 A | 5/2000 |

(Continued)

OTHER PUBLICATIONS

Borgolte et al. "Delta:Automatic Identification of Unknown Web Based Infection Campaigns" Computer and Communications Security, Nov. 4, 2013, pp. 109-120.

(Continued)

*Primary Examiner* — Benjamin E Lanier
(74) *Attorney, Agent, or Firm* — Arent Fox LLP; Michael Fainberg (57) ABSTRACT

Disclosed are system and method for building statistical models of malicious elements of web pages. One exemplary method comprises: obtaining, by a control server, data about malicious elements of web pages; transforming, by the control server, the obtained data into at least one N-dimensional vector; creating, by the control server, at least one cluster based on elements of the at least one N-dimensional vector; and building, by the control server, the statistical model of the malicious elements of the web page based on the created at least one cluster.

18 Claims, 6 Drawing Sheets

(56) References Cited

U.S. PATENT DOCUMENTS

| | | | |
|---|---|---|---|
| 9,923,916 | B1 | 3/2018 | McClintok et al. |
| 10,291,640 | B2* | 5/2019 | Kupreev ............ H04L 63/1416 |
| 2006/0095521 | A1 | 5/2006 | Patinkin |
| 2008/0263663 | A1 | 10/2008 | Ide |
| 2010/0169973 | A1 | 7/2010 | Kim |
| 2010/0299430 | A1* | 11/2010 | Powers ................ H04L 12/282 |
| | | | 709/224 |
| 2011/0185421 | A1 | 7/2011 | Wittenstein et al. |
| 2012/0198528 | A1 | 8/2012 | Baumhof |
| 2014/0165198 | A1 | 6/2014 | Altman |
| 2014/0283067 | A1 | 9/2014 | Call et al. |
| 2014/0351939 | A1* | 11/2014 | Moore ................ G06F 21/554 |
| | | | 726/25 |
| 2015/0033322 | A1* | 1/2015 | Wang ................ H04L 63/0254 |
| | | | 726/13 |
| 2016/0352772 | A1 | 12/2016 | O'Connor |
| 2017/0337376 | A1 | 11/2017 | Reader |

FOREIGN PATENT DOCUMENTS

| | | |
|---|---|---|
| JP | 2010079871 A | 4/2010 |
| JP | 2012088803 A | 5/2012 |
| RU | 2446459 C1 | 3/2012 |
| WO | 2015/112301 A1 | 7/2015 |

OTHER PUBLICATIONS

Jung et al. "The Protection of Technology of Script Based Cyber Attack" Journal of Communication and Computer. vol. 12, No. 2, Feb. 28, 2015 pp. 91-97.

Wang et al. Hashing for Similarity Search: "A Survey", Aug. 14, 2014, Retreived from the internet on Feb. 23, 2016 url http://arxiv.org/pdf/1408.2927v1.pdf.

* cited by examiner

SYSTEM AND METHODS FOR BUILDING STATISTICAL MODELS OF MALICIOUS ELEMENTS OF WEB PAGES

CROSS-REFERENCE TO RELATED APPLICATIONS

This application claims benefit of priority to U.S. patent application Ser. No. 15/475,885 filed on Mar. 31, 2017, which claims priority under 35 U.S.C. 119(a)-(d) to a Russian Application No. 2016139468 filed on Oct. 10, 2016, which are herein incorporated by reference in their entirety.

FIELD OF TECHNOLOGY

The present disclosure relates generally to the field of cybersecurity, and more specifically to systems and methods of detecting malicious elements of web pages.

BACKGROUND

In recent times banks and other financial organizations have been actively adopting web banking services (Internet banking) as part of the banking services. Web banking is the general term for technologies of remote banking services, as well as access to accounts and operations (with them) available at any time and from any computer having access to the Internet. To perform these operations, a web client (such as a browser) is typically used.

The widespread use of such technologies naturally attracts hackers, who are interested in stealing funds from the accounts of the users of the remote service systems. One of the popular attacks on the users of web banking is an attack during which malicious software is put in place of the contents of the web page being displayed to the user. The malicious software embeds a HTML code in the web page. This attack is often called a "man in the browser" or "web code injection" attack. The attack may start with the use of a Trojan application, for example, which installs a malicious extension in the victim's browser, which is launched when the browser is restarted. There then occurs an intercepting of the user's traffic being routed to a particular web site (most often a banking site). The web page being displayed to the user is then altered (during its loading or opening), making it possible to modify the external appearance of a particular element of the web page, steal the victim's authentication data being entered, or redirect funds being transferred by the user to a third-party account.

Solutions existing at present appear to be aimed at increasing the secure working of a user in a network with regard to attacks which introduce outside code into a web page. However, these solutions do not effectively determine whether a web page has been altered by malicious software, and identify anomalous elements in the web page version at the user's end without installing additional software. At the same time, the additional software such as various security clients, thin clients (light agents), and other antivirus means are not always able to be installed at the user's end, which ultimately results in errors in the operation of the antivirus application. Thus, for example, an error of a first kind may involve letting through an attack of the "man in the browser" type to the computing system in order to seize the data transfer channel and obtain access to all information being transferred, and an error of a second kind may involve the erroneous determination of a legitimate web page alteration at the user's end as being anomalous.

SUMMARY

Disclosed are systems and methods for building statistical models of malicious elements of web pages. One exemplary method comprises: obtaining, by a control server, data about malicious elements of web pages; transforming, by the control server, the obtained data into at least one N-dimensional vector; creating, by the control server, at least one cluster based on elements of the at least one N-dimensional vector; and building, by the control server, the statistical model of the malicious elements of the web page based on the created at least one cluster.

In one aspect, the method further comprises: obtaining data about elements of a tested web page comprises: receiving, by the control server, data from one or more user devices, the data having been gathered using scripts configured to be executed by the one or more user devices; and refining, by the control server, the statistical model of the malicious elements based of the data received from the one or more user devices.

In one aspect, the script to be executed by the user device is inserted by a node located between the user device and a web server sending a web page to the user device, wherein the script is inserted within the web page presented to the user device.

In one aspect, the user devices transmit the data gathered by executing the scripts in raw format.

In one aspect, the data about the malicious elements of the web pages is obtained from a database that contains results from antivirus scans.

In one aspect, the obtained data includes at least one of: scripts and forms.

In one aspect, the data about the malicious elements of web pages is obtained from a repository containing copies of known malicious software.

One exemplary system for building statistical models of malicious elements of web pages comprises: a control server having at least one processor configured to: obtain data about malicious elements of web pages; transform the obtained data into at least one N-dimensional vector; create at least one cluster based on elements of the at least one N-dimensional vector; and build the statistical model of the malicious elements of the web page based on the created at least one cluster.

One exemplary non-transitory computer readable medium storing thereon computer executable instructions for building statistical models of malicious elements of web pages, comprises instructions for: obtaining, by a control server, data about malicious elements of web pages; transforming, by the control server, the obtained data into at least one N-dimensional vector; creating, by the control server, at least one cluster based on elements of the at least one N-dimensional vector; and building, by the control server, the statistical model of the malicious elements of the web page based on the created at least one cluster.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects on the invention are described herein in the context of a system, method and computer program product for detecting anomalous and malicious elements of web pages. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used in describing example aspect of the invention:

A web page may include data (code) created by a web server for processing by a web client (browser) and organized with the use of hypertext markup languages (HTML, XHTML, XML, WML, VML, PGML, SVG, XBRL and others) and script languages (JScript, JavaScript, ActionScript, Tcl, Lua, Perl, PHP, Python, REBOL, Ruby and others).

Content here may refer to the content of the web page.

A script may include a procedure being executed, written in a script language, which may be launched for execution at a server's or client's end by a request arriving upon display of a strictly determined web page.

An inline script may include a script whose executable code (body) is part of the content of the web page. For example, the inline script may be disposed between tags <script></script>.

A tag (marker) may include a special construction of hypertext markup language. It may constitute text enclosed in angled brackets <name_tag>. Each tag may bring a particular command to a browser on how to display the tag and the subsequent content. Tags in a particular case may have attributes which clarify the tag, expand the possibilities of the tag and allow for a more flexible control, for example of the content of the container tag. For example, <script src="URL"> . . . </script>. The attribute src may indicate the location of the body of the script.

A container tag may include a paired tag having opening and closing tags. It may contain both text and other elements of hypertext language.

An element of a web page (an element of markup language) may include a combination of a starting tag, an end tag (in certain cases the starting and the end tags coincide, for example in the case of the tag <br>), and the content between the tags. The totality of elements of the web page form the content of the web page. At least the following kinds of elements may exist, being distinguished by the names of the corresponding tags: hyperlinks, text blocks, text formatting, lists, objects (e.g., media files, applets, scripts, native code and others), images, image maps, tables, forms, characters, and others.

Figure 2:
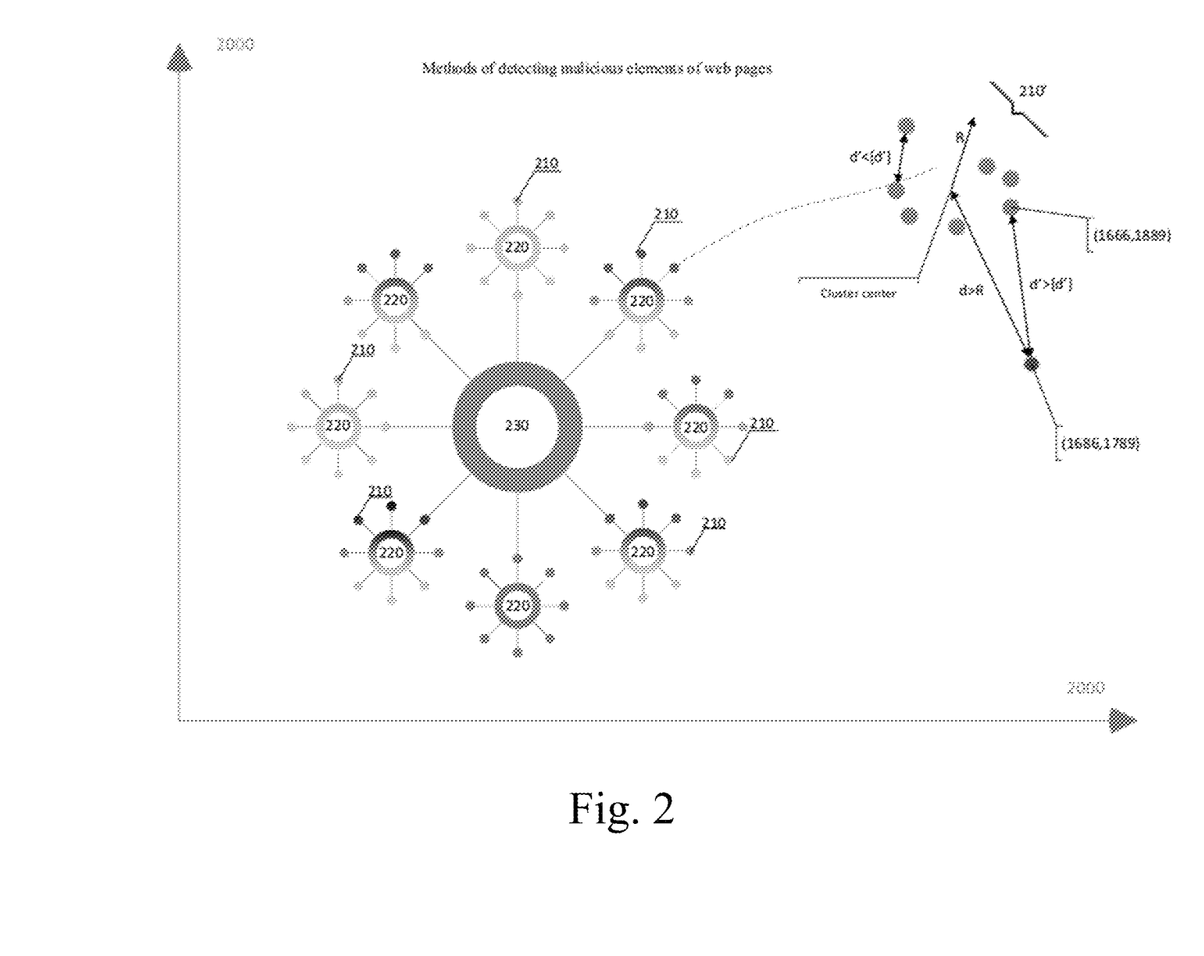
FIG. 2 shows an example of an N-dimensional space with statistical models and metrics of a cluster, according to aspects of the present invention.

An N-dimensional vector of an element may include an ordered set of n real numbers, where the numbers may include the coordinates of a vector. The number of coordinates of the vector is known as the dimensionality of the vector. The coordinates may determine the position of the corresponding element (such as a script) or group of elements of the same kind (such as the elements of forms) of a web page in N-dimensional space (FIG. 2 shows an example of two-dimensional space). The vector may be obtained by transformation of information about the content of the element or group of elements. The vector may reflect certain information about the content of the element or group of elements. In one example, each coordinate may reflect one of the characteristics of the content of the element, for example, one coordinate may characterize the number of operators in the script, another the number of eval operators. The numbers may also reflect the lexicographical order of the string parameters of the content of the elements or the Levenshtein distance between string parameters of different elements. For example, FIG. 2 shows examples of vectors, in particular two-dimensional vectors with coordinates (1666, 1889) and (1686, 1789).

A cluster may include a set of allowable values of the coordinates of vectors for a strictly defined element or group of elements in N-dimensional space. According to one exemplary aspect, a selected element or group of elements may be assigned to a certain cluster if a distance from the N-dimensional vector of the element to the center of that cluster is less than the radius of the cluster in the direction of the N-dimensional vector. FIG. 2 shows an example of the cluster 210'. In an example, an element may be assigned to a certain cluster if the value of a distance (in FIG. 2, "d"') from the N-dimensional vector of the element to the nearest N-dimensional vector of an element of the given cluster is less than the maximum allowable (threshold value of the distance [d']) or if the value of the distance (in FIG. 2 "d") from the N-dimensional vector of the element to the center of that cluster is less than the radius of this cluster. For example, the distance from the vector (1666, 1889) to the center of the cluster is less than the radius of the cluster, and consequently the element or group of elements whose content may be reflected by the vector belongs to the given cluster. On the other hand, the distance from the vector (1686, 1789) to the center of the cluster is greater than the radius of the cluster and the distance to the nearest N-dimensional vector is greater than a threshold value, and therefore the element or group of elements whose content may be reflected by the vector does not belong to that cluster. Variants of distances for evaluating proximity may include, but limit to the following: linear distance, Euclidean distance, the square of Euclidean distance, generalized Minkowski exponential distance, Chebyshev distance, Manhattan distance and others.

The measure of proximity (degree of similarity, coefficient of similarity) may include a nondimensional parameter for determining the similarity of elements of a web page.

Measures used for determining the measure of proximity may include, but not limit to the following: Ochaiai, Jaccard, Sokal-Sneath, Kulczynski, symmetrical Dice coefficient and others.

The center of a cluster (centroid) may be the mean geometrical locus of the N-dimensional vectors in N-dimensional space. For clusters consisting of one vector, the given vector may be the center of the cluster.

The radius of the cluster (in FIG. 2 "R") is the maximum distance of the N-dimensional vectors occurring in the cluster from the center of the cluster.

Various known algorithms and approaches may be used for clustering, including hierarchical (agglomerative and divisive) and non-hierarchical.

A statistical model of the elements of a web page (model of the elements of a web page) may include a set of clusters 210 for the elements of one kind or groups of elements of one kind. For example, the statistical model of scripts of a web page, the statistical model of the forms of a web page. In FIG. 2, the statistical models of the elements of a web page may be designated as 220. For models consisting of one cluster, that cluster may be the model of the elements.

A statistical model of a web page (model of a web page) may include a set of clusters of elements of the web page of all kinds and/or groups of elements (including groups of elements containing elements of different kinds). For example, the statistical model of the authorization page. In other words, the statistical model of a web page 230 may include a set of models of the elements of the web page 220. By analogy, the statistical model of a web site may include a set of clusters of elements of the web page of all kinds and/or groups of elements of all web pages of the web site. That is, the statistical model of a web site (not shown in the figures) may include a set of models of the web pages 230.

A statistical model of malicious elements of a web page may include a group of clusters 210 for known malicious elements of the same and/or different kind or groups of elements of the same and/or different kind. Examples of models may include: a statistical model of malicious scripts of a web page, a statistical model of malicious forms of a web page, a statistical model of malicious scripts and forms of a web page. For models comprising a single cluster, that cluster will be the model of the malicious elements. In order to construct models of a given kind, one may use known malicious elements whose content is transformed into N-dimensional vectors, followed by clusterization and combining into a model. In their form, a statistical model of a web page and a statistical model of malicious elements of a web page do not differ from each other; the elements used to construct the model are different, in the first case the model is built from potentially dangerous elements and in the second case from known malicious elements.

An anomalous element of a web page may include an element of a web page whose vector does not pertain to any of the clusters of the statistical model of the web page constructed for elements of the given type, or one which has a statistical significance below a threshold.

The statistical significance of an element may be the value of the ratio of the number of times the element being evaluated is encountered in the content of the web pages to the total number of web pages obtained for the construction of the model or to the number of web pages obtained for the construction of the model on a certain section (the evaluation section), where the length of the section may be determined by the number of web pages obtained for the construction of the model as of a particular time, such as the time of commencement of observation of the element. For example, if 100 pages have been obtained and the element being evaluated has been encountered 30 times, the statistical significance is 30%.

The statistical significance of a cluster may be the value of the ratio of the number of elements whose vectors form the cluster being evaluated in the content of the web page to the total number of web pages obtained for the construction of the model or to the number of web pages obtained for the construction of the model on a certain section, where the length of the section may be determined by the number of web pages obtained for the construction of the model as of a particular time, such as the time of commencement of observation of the cluster.

The threshold value of statistical significance may be the value of the statistical significance of an element or cluster beyond which the element or cluster (and the elements of the cluster) are considered to be statistically significant, in the event that if the value of the statistical significance of an element of a cluster is below the established threshold value, the element or cluster is considered to be anomalous.

To create the clusters, hierarchical methods may be used, for example, the cluster may be created by an agglomerative method, in which the nearest (in distance) N-dimensional vectors of the elements may be isolated into clusters or the nearest (in distance) clusters may be combined into one cluster. When using this method, linear or Euclidean distance or generalized exponential distance of Minkowski, Chebyshev or Manhattan may be used. Further, the vectors may be considered to be nearest which have the least mutual distance, and a cluster may be isolated until such time as the radius of the cluster comes as close as possible to a threshold value of the radius, where the closest possible radius may be the one which will exceed the threshold value of the radius in the next round of isolating the cluster. In another case, a cluster may be isolated until such time as no clusters or vectors with a permissible measure of proximity remain, where the permissible measure of proximity may be a measure not exceeding the established threshold value. Clusters are closest which have the least distance between the centers.

Alternatively, clusters may be created by a divisive method, where a cluster may be formed by vectors whose mutual distance is less than a maximum permissible distance, the maximum permissiveness of the distance being determined by a threshold value, and the clusters may be separated until such time as the radius of the cluster becomes equal to or less than the threshold value of the radius, for example.

Figure 1:
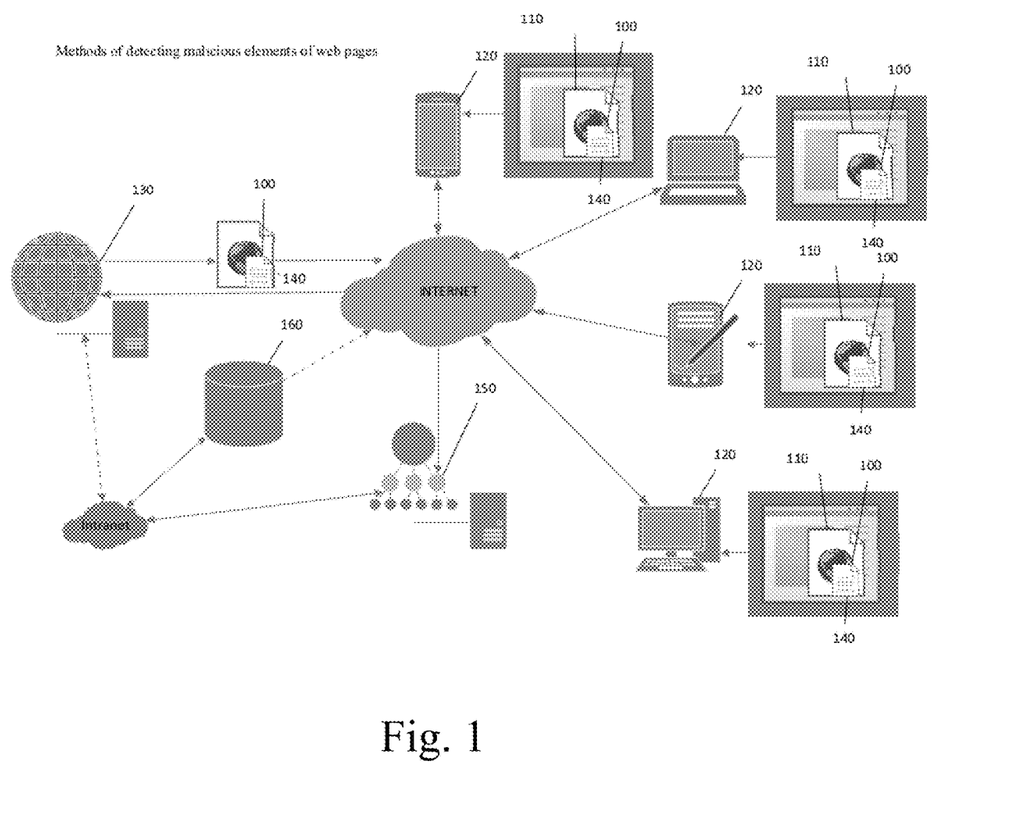
FIG. 1 illustrates an exemplary system for detecting of anomalies and malicious elements of web pages, according to aspects of the present invention.

FIG. 1 illustrates an exemplary system for detecting of anomalies and malicious elements, which are used to construct statistical models of web pages 100 and statistical models of malicious elements of web pages, as well as to detect anomalous and malicious elements of web pages, according to aspects of the present invention. The system may include, but not limited to: a user device 120, with a web client 110 installed on it; a web server 130; a control server 150 and a database 160.

In one exemplary aspect, a web client 110, such as a Web browser, may be installed on the user's device 120. The web client 110 may be configured to request, process, manipulate and display the content of web sites, where a web site may include a set of logically interrelated web pages 100. The web client 110 may dispatch requests to obtain resources, designated, for example, by uniform resource locator (URL) addresses to the web server 130 and receive replies, generally along with a web page 100 or an element of a web page from the web server 130. The web server 130 on request from the web client 110 may send out a ready web page 100 or form a page dynamically, in the invention being described by the web server 130 for each web page 100 being sent to the client, and in addition to the usual content there is added a script 140. The function of the script 140 may include gathering at least at the web client's end 110 the data of a web page 100 (information about the elements or a group of elements of the web page, information about an element, in a particular case the content of an element) which contains the given script 140. In one example, the information about the element of the web page 100 may include the content of the given element. The elements of a web page 100 and the content of these elements of the web page 100 at the web client's end 100 may differ from the elements and the content of these elements of the same version of the web page 100 at the web server's end 130, by reason of the dynamic refreshing of the web page at the web client's end 110 or as a result of a "man in the browser" attack.

In one exemplary aspect, the control server 150 may receive the information gathered by the script as to the elements or group of elements of the web page. The script may dispatch the gathered data either in a "raw" or transformed state, the format of the data being dispatched may be determined by the functionality of the script 140 which has been added by the web server 130 to the web page 100, namely: the script in the process of execution dispatches strictly defined information on the elements of the web page 100 in a strictly specified form, dictated by the functionality of the script; or the script dispatches data to the web server 130 or to the control server as to its successful launching at the client's end 110 and receives in response a command as to which elements of the web page 100 need to be gathered and in what form and to dispatch the information to a recipient (the web server 130 or directly to the control server 150). In one exemplary aspect, the script 140 may be embedded in the web page 100 at an intermediate node, e.g., by a corporate proxy server.

The primary methods of transformation of data may include, but not limit to the following: quantization, sorting, merging (pasting), grouping, data set configuring, inserting of values in tables, computed values, data coding, normalization (scaling).

In one example, as a result of the transformation of the data, the data may acquire the attributes of information.

One of the methods of transformation of scripts may include the construction of an abstract syntactical tree and transmission to the recipient (the web server 130 or directly to the control server 150) of only the significant operators and constructions predetermined by the settings of the script 140 or by commands from the recipient.

In one exemplary aspect, all data collected by the script 140 may be transmitted ultimately to a control server 150. The control server 150 may obtain data directly from the web clients 110, or via the web server 130. In another aspect, the control server 150 may be present in the same network as the web server 130. The data collected by the control server 150 may be used to construct the statistical model of the web page 230 (or the statistical model of malicious elements of the web page) and to detect anomalous (or malicious) elements of the web pages. The control server 150, may transform the data collected by the scripts 140 into N-dimensional vectors, and the obtained vectors may be stored in the database 160. Particularly, the control server may calculate, from the content of the element, a hash by one of the hashing algorithms (CRC, MD5, MD6, SHA1, SHA2, GOST R 34.11-2012 and so on).

An analysis module of the control server 150 forms clusters 210 from the received vectors and to detect anomalous elements or groups of elements whose content may be reflected by the received vectors, this function being implemented by a mutual comparison of the N-dimensional vectors and the formed clusters 210 in N-dimensional space.

In one exemplary aspect, the database 160 may be configured to store the constructed models and vectors as well as the hashes of the known malicious elements. Records on the hashes of malicious elements may arrive in the database from external sources (i.e., the hashes that have already been calculated) or the hashes may be calculated by the control server 150 from the content of known malicious elements which are detected as a result of an antivirus scan of anomalous elements or which are selected from a repository of malicious software (not shown in the figures), storing copies of malicious elements of web pages.

The system disclosed in the present invention may carry out several methods: the method of constructing a statistical model of a web page 230, the method of constructing a statistical model of malicious elements of a web page, the method of detecting anomalous elements of a web page 100 with the aid of the constructed model of the web page 230, the method of detecting malicious elements of a web page 100 with the aid of the constructed model of malicious elements of the web page, the method of detecting malicious elements of a web page 100 with the aid of hashes. These methods are illustrated in FIG. 3.

Figure 3:
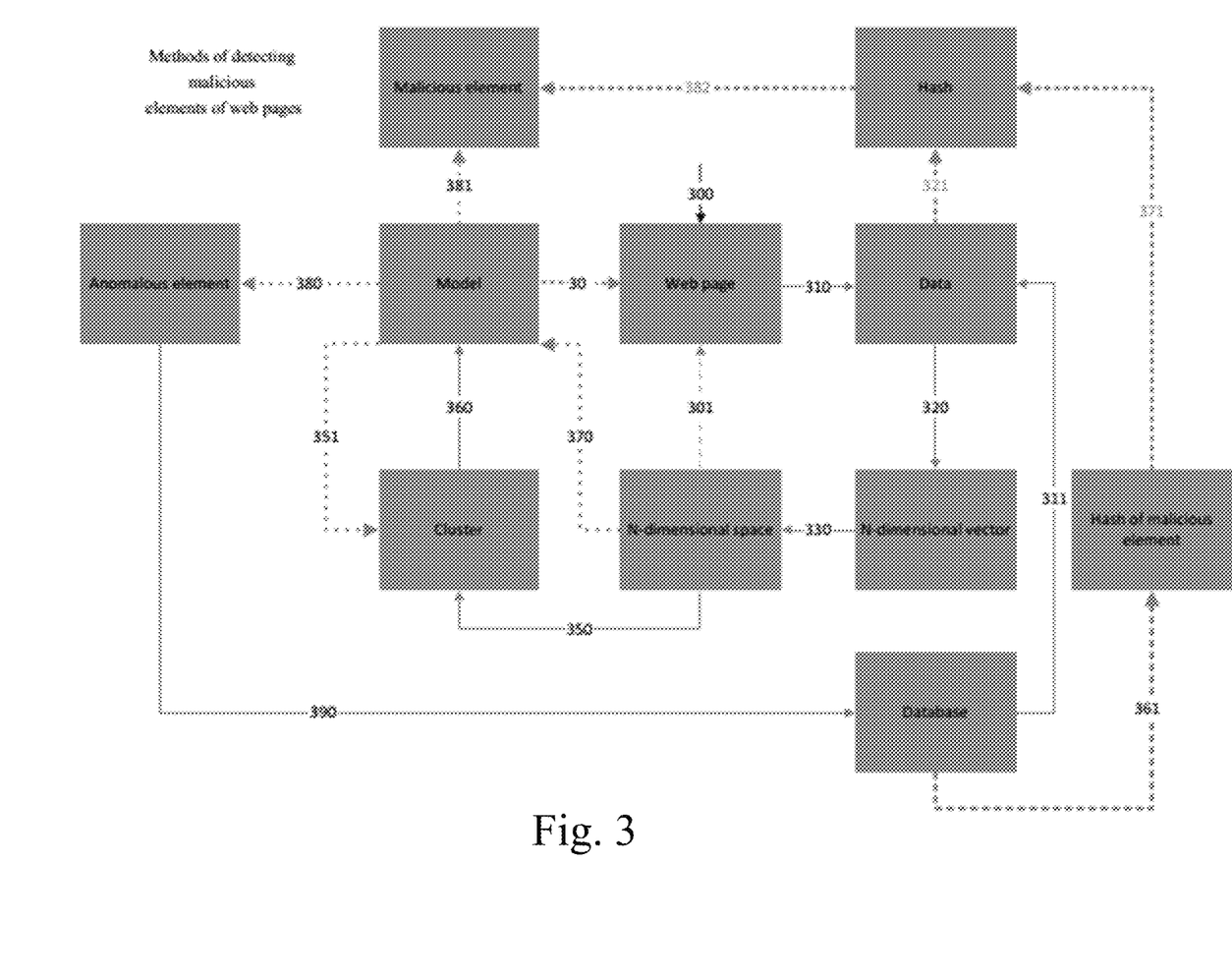
FIG. 3 shows exemplary methods for detecting anomalous and malicious elements of web pages, according to aspects of the present invention.

With reference to FIG. 3, an exemplary method of construction of a statistical model of the web page 230 may be implemented as follows. In step 300, a user may obtain access to a web site from his device, where the web client 110 by a request sent to the web server 130 may be configured to obtain from the web server 130 the web page 100 of the site, during which process the web server 130 (or an intermediate node) may be configured to add a script 140 to the web page 100. In step 310, the script may be executed at the web client's end 110, gathering data contained in the web page 100. The data gathered by the script 140 may contain various information, in particular the script 140 may gather the content of at least one element of the web page (script, form, etc.). The data gathered by the script 140 may be configured to be transformed if necessary, the data being transformed either by the script 140 itself or by the processing means on the control server 150. In step 320, the gathered data may be configured to be transformed into at least one N-dimensional vector, which may be saved in step 330. From at least one vector, in step 350, there may be created at least one cluster 210. On the basis of at least one created cluster 210, in step 360, a statistical model of the web page 230 may be created.

In one example, after the saving of the obtained N-dimensional vector, in step 301, the web page 100 may be obtained by another web client 110 and on the basis of the data gathered from this web page, N-dimensional vectors may be additionally obtained in step 320 and only after this are the clusters created.

In another example, after creating the clusters 210 and constructing the model 230, in step 302, the web page 100 may be obtained by another web client 110 and on the basis of the data gathered by the script 140 from this web page N-dimensional vectors are obtained, and on the basis of the obtained N-dimensional vectors the previously created clusters 210 may be corrected (refreshed) (their radius, center/centroid are changed), or new clusters 210 may be created, thereby refining (with the corrected clusters 210) and supplementing (with the newly created clusters 210) the statistical model of the web page 230. The data gathered by the script 140 may differ from the data gathered by the script 140 in the previous iteration, for example, information about other elements of the web page 100 may be gathered.

In one exemplary aspect, the method for detecting anomalous elements on the basis of a statistical model of a web page 230 may be implemented as follows: In step 300, the user may obtain access to a web site from his device, where the web client 110 by a request sent to the web server 130 may be configured to obtain from the web server 130 the web page 100 of the site, during which process the web server 130 (or an intermediate node) may be configured to add a script 140 to the web page 100. In step 310, the script may be executed at the web client's end, gathering data contained in the web page 100. The data gathered by the script 140 may contain various information, in particular the script may gather the content of at least one element of the web page (script, form, etc.). The data gathered by the script 140 may be configured to be transformed if necessary, the data being transformed either by the script 140 itself or by the processing means of the control server 150. In step 320, the gathered data may be configured to be transformed into at least one N-dimensional vector, which may be saved in step 330. The obtained vector in step 370 may be compared (by determining the mutual distance, for example, between the obtained vector and the center of the cluster) with the clusters of the constructed statistical model of the web page 230 and/or the N-dimensional vectors of the given model 230. In step 380, as a result of the comparison, the element being analyzed may be identified as being anomalous when, for example: (i) the distance between the N-dimensional vector of the element and the centers of all clusters of the model, in N-dimensional space, is greater than the radii of these clusters; or (ii) the measure of proximity between the N-dimensional vector of the element and the centers of all the clusters of the model, in N-dimensional space, is greater than a threshold value; or (iii) the measure of proximity between the N-dimensional vector of the element and the N-dimensional vectors of the clusters of the model which are most distant from the center of the clusters, in N-dimensional space, is greater than a threshold value.

In one example, if the element is not recognized as being anomalous, then in step 351, the N-dimensional vector of the given element may be added to the statistical model of the web page 230.

In another example, upon detecting an anomalous element of the web page 100, the web server 130 may be configured to disable the connection with the web client 110 and the user's device 120 or the connection may be preserved, but the web server 130 may cease responding to requests of the client 110 (the data transmission via the connection is halted). At the moment of halting the data transmission, the detected anomalous element of the web page may be scanned, in step 390, by the antivirus means (not shown) of the control server 150 for the presence of a malicious functionality (danger) or an observation may be carried out on that element. If a cluster is formed around it with a statistical significance above a threshold, the detected anomalous element may be identified as being safe, such that the connection is re-established, and the session continues.

In a particular case, when the model is constructed on the basis of web pages not knowing in advance whether or not they contain anomalous elements, a collision may be possible: the N-dimensional vector of the element does not turn up in any of the clusters of the model and a dilemma arises—whether to create a new cluster on the basis of the given vector or to identify the element whose content is reflected by the given vector as being anomalous. The collision may be resolved on the basis of an evaluation of the statistical significance of the element or the cluster, which may be created on the basis of elements similar (close) to the one being evaluated on the evaluation section. Namely, on the basis of the ratio of the number of web pages containing the element being evaluated (or nearby elements, elements whose distance between their N-dimensional vectors in N-dimensional space is less than a certain threshold value) to the total number of web pages being used in the construction of the model on the section being evaluated, where the length of the section is measured as the number of pages or iterations. If the value of the statistical significance of the evaluated element of the web page on the evaluation section is close (the proximity being determined by a threshold value) to the value of statistical significance of the other elements (or the mean value of the statistical significance of the other elements) on the given section or surpasses a certain threshold value, such as by 20%, then the element is recognized as being statistically significant, or else (if it does not surpass it) as being anomalous. For example, in the model construction step a certain element of the web page 100 may appear, whose vector may not turn up in any of the previously created clusters 210.| It is thus necessary to determine whether the given element is anomalous by, for example, determining its statistical significance on a section, where the length of the section comprises 200 web pages 100. In one example, the threshold value of statistical significance for the given type of element may be equal to 20%. This verification shows that, on the given length of element, elements close to the evaluated one have been encountered 4 times, which may correspond to a value of statistical significance of 2%, which is lower than the threshold value, so that the element being evaluated and those close to it (the cluster formed around the evaluated element) may be anomalous. The threshold value of statistical significance, in a particular case, may be determined as the minimum value of statistical significance of the cluster for an element of the same kind. For example, the model contains clusters of scripts with statistical significance values of 25%, 32%, 47% and 95%, and therefore the threshold value for the given kind of element may be set at 25%.

In one exemplary aspect, the statistical significance may also be used in the detection of anomalous elements of web pages. For example, this is used when the statistical model has not been constructed, or the above-described dilemma is being resolved. In the first step, web pages 100 may be obtained from the web server 130 by the web client 110 and implemented on the user devices 120, the web pages 100 containing a script 140 which when executed gathers information about the content of at least one element of the web page 100 at the web client's end 110 and dispatches the gathered information from the user device 120. The aforementioned script may be executed with the help of the web client 110 to gather information on the content of at least one element of the web page 100 at the web client's end 110 and dispatch the gathered information from the user devices 120 whose web clients 110 have received the web page 100. At the control server's end 150 the information on the content received from the devices 120 may be configured to be transformed into N-dimensional vectors of the elements, and the obtained N-dimensional vectors may be clustered by any suitable method. The N-dimensional vectors may be formed for each element of the web page, for a group of elements, for a group of elements of the same kind, or elements of different kinds may make up the group. After the clusters 210 have been formed, where a cluster 210 may include at least one vector, the statistical significance of the obtained clusters 210 may be determined, where the statistical significance may be determined as the ratio of the number of N-dimensional vectors in the cluster 210 to the number of web pages 100 from which information on the content of their elements was gathered and dispatched to the control server 150 or the web server 130. As a result, elements whose N-dimensional vectors form a cluster with statistical significance less than a threshold may be determined and identified as being anomalous elements. The threshold significance may be assigned by the methods described above, and it may also depend on the kinds of elements, the methods of clustering, the length of the evaluation section, and so on.

In one exemplary aspect, when a user requests a web page of a web banking site, e.g., https://my.KasperskyBank.ru/, the requested web page may be added a script 140, and the page 100 may be dispatched to the web client 110 implemented on the user device 120. The script 140 at the user's end may gather the <script> elements present on the web page:

```
<script>document.documentElement.id="js";var ..../Kasperskybank/";</script>
<script src="//static.kaspersky.ru/dist/kfs/kfs.js" crossorigin="anonymous"></script>
<script src="https:// static.kaspersky.ru
/ib/prod/2842c77095d860e412d7a8cf30231fd53c89fb4e/ Kasperskybank /
Kasperskybank.js" crossorigin="anonymous"></script>
<script async="" src="/kfs/kfs"></script>
<script>!function( ){var e=document.getElementById("before-
init__noscript");e&&(e.className="ui-browser__holder-block-hide");var
o=function( ){try{return"withCredentials"in new
XMLHttpRequest}catch(e){return!1}}( );if(o){var
t=function( ){if(navigator.cookieEnabled)return!0;document.cookie="cookietest=1";var
e=-1!=document.cookie.indexOf("cookietest=");return document.cookie="cookietest=1;
expires=Thu, 01-Jan-1970 00:00:01
GMT",e}( );if(t)document.body.removeChild(document.getElementById("before-
init"));else{var n=document.getElementById("before-
init__nocookies");n&&(n.className="ui-browser__holder-block")}}else{var
r=document.getElementById("before-init__old-browser");r&&(r.className="ui-
browser__holder-block")}}( );</script>
```

For the <script> elements having the attribute src, a loading and normalization of the body of the script may be performed; for inline scripts, only a normalization. For example, for the above-indicated inline scripts, the normalized form may be as follows (only the significant language constructions and standard objects/methods have been kept, the literals have been "depersonalized"):

```
document.documentElement.i0=v0;vari1=window.i1||{ };i1.i2=v1,i1.i3=v2,i1.i4=v3,i1.i5=
v4,i1.i6={i7:v5,i8:v6},i1.i9=v7;
!function( ){vari0=document.getElementById(v0);i0&&(i0.i1=v1);vari2=function( ){try{return
v2innewXMLHttpRequest}catch(i0){return!v3}}( );if(i2){vari3=function( ){if(navigator.i4)
return!v4;document.cookie=v5;vari0=-
v3!=document.cookie.indexOf(v6);returndocument.cookie=v7,i0}( );if(i3)document.body.
removeChild(document.getElementById(v8));else{vari5=document.getElementById(v9);i
5&&(i5.i1=v10)}}else{vari6=document.getElementById(v11);i6&&(i6.i1=v10)}}( );
```

Next, the script 140 may gather the <input> elements present on the page:

```
<input autocomplete="off" autocorrect="off" autocapitalize="off"
class="m-login__form-field-input ng-pristine ng-invalid ng-invalid-
required ng-touched" type="text" ... ng-blur="login.focus = false"
placeholder="password">
```

The script 140 may transform the gathered data of the <input> elements, performing a normalization, for example, as follows (the attributes are sorted alphabetically, the tag name is cut off, gaps in the values of the attributes are cut out, the attributes are listed by ";"):

```
<autocapitalize=off;autocomplete=off;autocorrect=off;class=m-login__form-field-
inputng-pristineng-invalidng-invalid-requiredng-touched;name=lg;ng-
blur=login.focus=false;warmUp( );;ng-change=input(true);ng-disabled=false;ng-
keydown=login.focus=true&&$event.keyCode===13&&authUser( );ng-
keyup=fix(login.form.lg,$event);ng-
model=login.lg;placeholder=login;spellcheck=false;style=padding:0px;;type=text;ui-
```

```
focus=login.setFocus;validator=validator.lg>
<autocapitalize=off;autocomplete=off;autocorrect=off;class=m-login__form-field-
inputng-pristineng-untouchedng-invalidng-invalid-required;name=pw;ng-
blur=login.focus=false;ng-change=input( );ng-disabled=false;ng-
keydown=login.focus=true&&$event.keyCode===13&&authUser( );ng-
keyup=fix(login.form.pw,$event);ng-
model=login.pw;placeholder=password;spellcheck=false;type=password;validator=validator.pw>
```

Figure 4A:
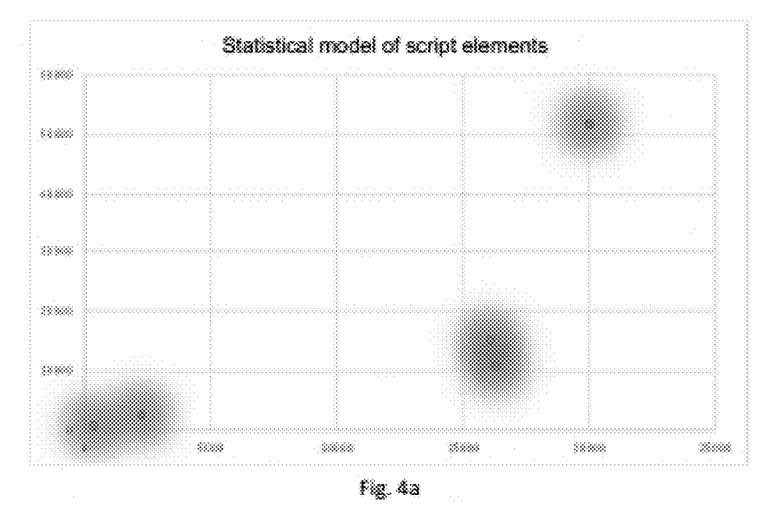
FIGS. 4a, 4b and 4c show examples of visualizations of statistical models, according to aspects of the present invention.
Figure 4B:
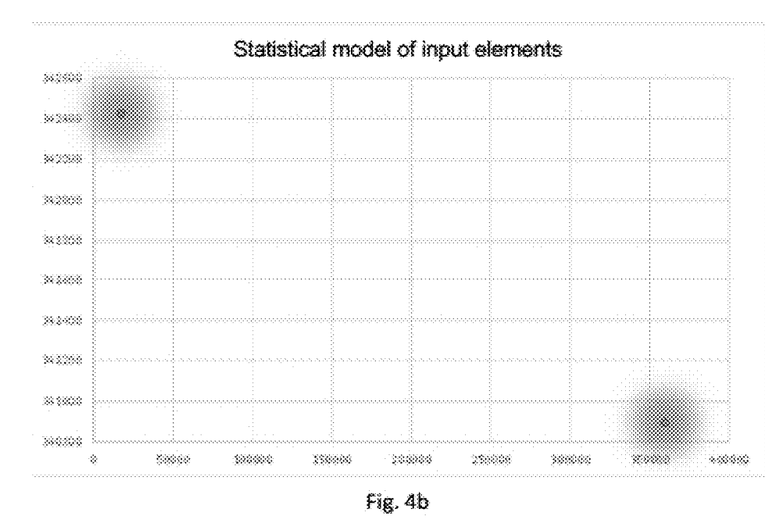

The script 140 may dispatch the gathered data to the control server 150. The control server 150 may process the gathered data of the <script> elements in the context of the corresponding model (unitary for all script elements—the statistical model of the script type elements 220), as follows:
for each script, a numerical vector may be obtained (for example, the vector may be two-dimensional), where the vector may be computed from the codes of the string characters (any suitable coding method may be used to obtain the character codes, such as ASCII), making up the gathered data (for inline scripts, this data may include the content of the normalized script, for others it is the content of the src attribute). The following vectors may be obtained for the <script> elements contained in the resulting web page 100:
16314,10816
2254,2598
16084,15036
356,822
20010,51838
each vector may be saved in the two-dimensional space of the model 230, in the given case there are no anomalies, all vectors end up in the previously formed clusters (i.e., all vectors are compatible with the data arriving from the script 140 from those versions of the web pages previously). As an illustration, FIG. 4a presents a visualization of the model, where the dots indicate the <script> elements being analyzed, and the colored regions are the previously created clusters 210 of the model 220, as parts of the model 230:

The control server 150 may process the gathered data of the <input> elements in analogous manner, as a result the visualization has the form shown in FIG. 4b. Since no anomalous elements have been detected, the processing may end.

In one example, a malicious inject may have appeared at one of the users on the same page https://my.Kaspersky-Bank.ru/ in the form of an additional <script> element:
 <script src="https://static.kasperskyBank.ru/ib/prod/bank/malware.js"
  crossorigin="a nonymous"></script>

Figure 4C:
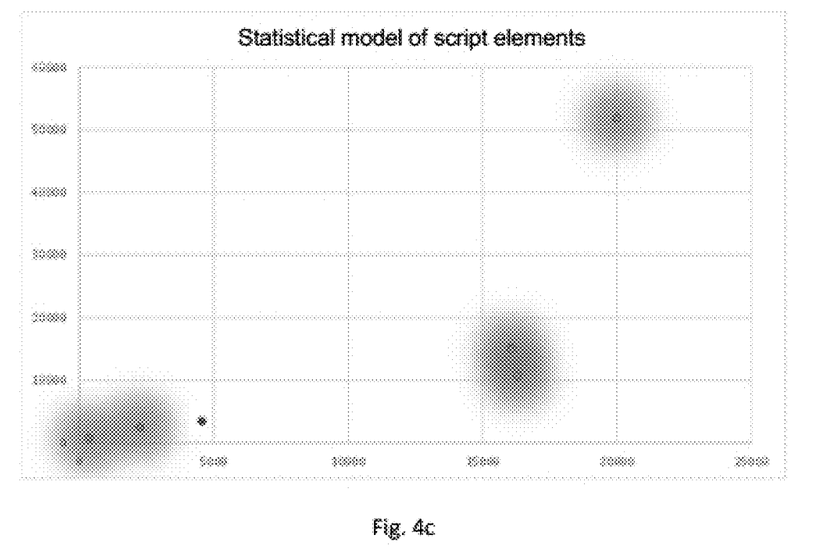

The vector, computed by the method described above, may be equal to (4560,3192) and the model may take on the form shown in FIG. 4c (the current vector reflecting the content of the inject, being an anomaly, is marked in red). The detected anomalous element in step 390 may be processed by the antivirus means of the control server 150, and the connection itself may be disabled, at the same time the element in the space of the model may be observed to determine its statistical significance.

It should be appreciated that the present invention may be used not only for detecting of anomalous elements, but also, as indicated above, for detecting malicious elements of web pages. For the detecting of malicious elements, the same statistical cluster models may be used. The difference between the statistical cluster models used for detecting anomalous elements and the statistical cluster models used for detecting malicious elements may include the information used to create the N-dimensional vectors which are clustered to build the model. When detecting anomalous elements, information about potentially dangerous elements may be used to create the clusters. When detecting malicious elements, information on known malicious elements may be used to create the clusters. Thus, the statistical models may differ only in the information used to construct the model. Therefore, an entity 230 in FIG. 2 may be used to define the statistical models of malicious elements of a web page. And the same system as illustrated in FIG. 1 may be used to build the models and detect the malicious elements.

Referring to FIG. 3, in one exemplary aspect, a method of building a statistical model of the malicious elements of a web page 230 includes: in step 311, data may be obtained by the control server 150 from the database 160 containing information about known malicious elements of web pages. In one aspect, these elements may have been detected earlier after an antivirus scan in step 390 of a detected anomalous element which has been recognized as being malicious, or using a repository containing copies of known malicious software. The data obtained in step 311 from the database 160 may contain various information relating to the content of a malicious element of a web page (a script, a form, and so on). The data, if need be, may be transformed by the control server 150 and in step 320 the collected data may be transformed into at least one N-dimensional vector, which may be gathered in step 330. From at least one vector, in step 350, at least one cluster 210 is created. On the basis of at least one created cluster 210 the statistical model of the malicious elements of the web page 230 may be constructed in step 360.

In one exemplary aspect, a method of detecting of malicious elements on the basis of a statistical model of the malicious elements of a web page 230 includes: in step 300 the user from his or her device may obtain access to a web site, where the web client 110 by a request sent to the web server 130 may obtain the web page 100 of the site from the web server 130, in this process a script 140 may be added to the web page 100 by the web server 130 (or by an intermediate node). In step 310, the script may be executed on the web client 110 side, collecting data contained in the web page 100. The data collect by the script 140 may contain various information. For example, the script may collect content of at least one element of the web page (a script, a form, and so on). The data collected by the script 140 may be transformed, if need be, wherein the data may be transformed either by the script 140 itself, or by the control server 150. In step 320, the collected data may be transformed into at least one N-dimensional vector, which may be stored in step 330. The obtained vector in step 370 may be compared (by determining the mutual distance, for example, between the obtained vector and the center of the cluster) with the clusters of the constructed statistical model of malicious elements of the web page 230 and/or with the N-dimensional vectors of the given model 230. In step 381, as a result of the comparison, the element being analyzed may be determined as being malicious upon detecting that: (1) the distance between the obtained N-dimensional vector and the center of at least one cluster of the statistical model in N-dimensional space is less than the radii of these clusters; (2) the distance between the obtained N-dimensional vector and the center of at least one cluster of the statistical model in N-dimensional space is equal to the radius of these clusters; (3) the measure of proximity between the obtained N-dimensional vector and the center of at least one cluster of the model in N-dimensional space is less than a threshold value; and/or (4) the measure of proximity between the obtained N-dimensional vector and at least one of the N-dimensional vectors furthest away from the center of at least one cluster of the statistical model in N-dimensional space is less than a threshold value.

In one exemplary aspect, a method of detection of malicious elements of a web page on the basis of hashes includes: in step 300, the user from his or her device may obtain access to a web site, where the web client 110 by a request sent to the web server 130 may obtain the web page 100 of the site from the web server 130, wherein a script 140 may be added to the web page 100 by the web server 130 (or by an intermediate node). In step 310, the script is executed on the web client side, collecting data contained in the web page 100. The data collected by the script 140 may contain various information. For example, the script may collect content of at least one element of the web page (a script, a form, and so on). In step 361, at least one hash may be obtained from the database 160, which has been calculated from the information about the content of a known malicious element of the web page, the information being obtained by the same methods as described above. The data collected by the script 140 may be transformed, if need be, wherein the data may be transformed either by the script 140 itself, or by the processing means of the control server 150. In step 321, the collected data may be used to calculate a hash. In step 371, the control server may compare the hash calculated in step 321 with the hash obtained in step 361 from the database 160. In step 382, the control server 150 may detect a malicious element as a result of analysis of the gathered information, where an element may be determined as being malicious when the hash calculated from the gathered information about its content matches, as a result of the comparison with the hash, the hash obtained from the database 160 in step 361.

In various exemplary aspects, web server, web client, database, intermediate node, control server with analysis module and processing module implemented thereon disclosed herein include real devices, systems, components, groups of components, realized with the use of hardware such as integrated microcircuits (application-specific integrated circuit, ASIC) or field-programmable gate arrays (FPGA) or, for example, in the form of a combination of software and hardware, such as a microprocessor system and a set of program instructions, and also on neurosynaptic chips. The functionality of the indicated elements of the system can be realized exclusively by hardware, and also in the form of a combination, where part of the functionality of the elements of the system is realized by software, and part by hardware. In certain variant embodiments, some of the elements, or all of the elements, can be implemented on the processor of a general-purpose computer (such as that shown in FIG. 5).

Figure 5:
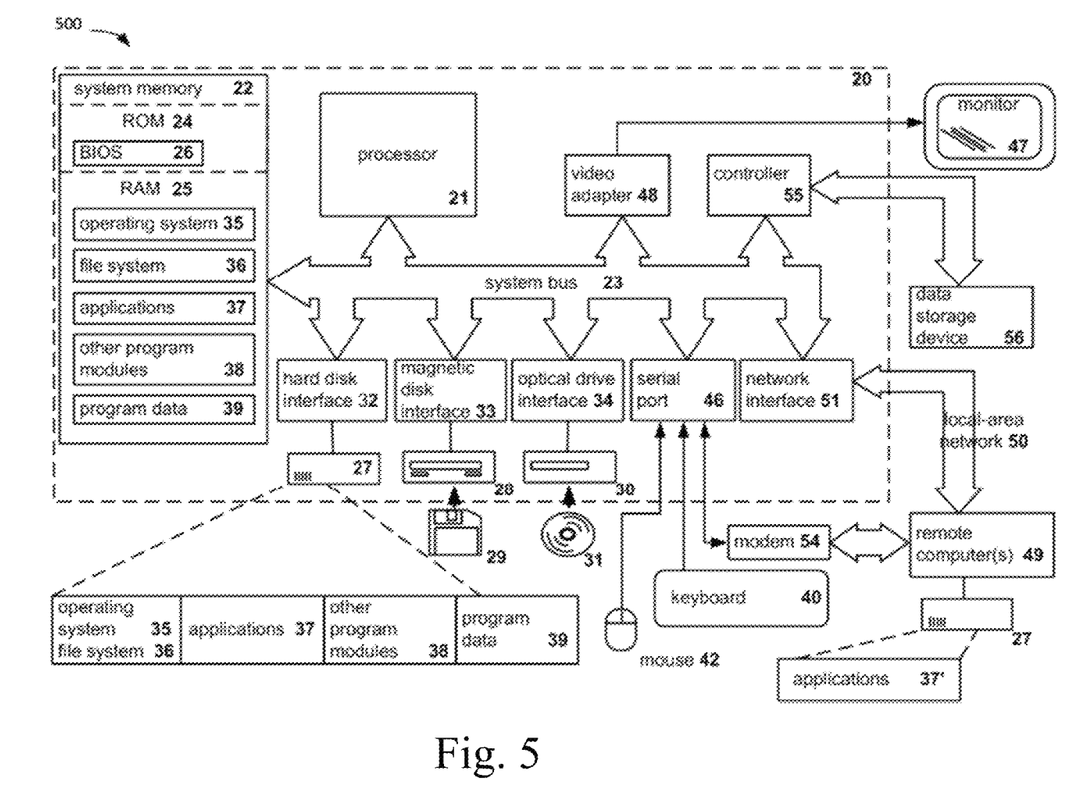
FIG. 5 shows an example of a general-purpose computer system on which the aspects of the systems and methods detecting anomalous and malicious elements of web pages can be implemented.

FIG. 5 is a diagram illustrating an example computer system on which aspects of systems and methods for detecting anomalous and malicious elements of web pages may be implemented in accordance with an exemplary aspect of the invention.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIGS. 1-4, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for building statistical models of malicious elements of web pages, the method comprising:
    obtaining, by a control server, data about malicious elements of web pages, wherein the malicious elements include at least one of scripts and forms;
    transforming, by the control server, the obtained data into at least one N-dimensional vector, wherein each coordinate of the vector represents at least one of a number of operators in the scripts or forms and a number of eval operators;
    creating, by the control server, at least one cluster based at least on a set of allowable values of the coordinates of vectors for a malicious element or a group of malicious elements in N-dimensional space; and
    building, by the control server, the statistical model of the malicious elements of the web page based on the created at least one cluster, wherein the statistical model is at least for scripts of the web page and/or forms of the web page.

2. The method of claim 1, further comprising:
    receiving, by the control server, data from one or more user devices, the data having been gathered using scripts configured to be executed by the one or more user devices;
    refining, by the control server, the statistical model of the malicious elements based of the data received from the one or more user devices.

3. The method of claim 2, wherein the script to be executed by the user device is inserted by the node located between the user device and the web server sending a web page to the user device, wherein the script is inserted within the web page presented to the user device.

4. The method of claim 2, wherein the user devices transmit the data gathered by executing the scripts in raw format.

5. The method of claim 1, wherein the data about the malicious elements of web pages is obtained from a database that contains results from antivirus scans.

6. The method of claim 1, wherein the data about the malicious elements of web pages is obtained from a repository containing copies of known malicious software.

7. A system for building statistical models of malicious elements of web pages, the system comprising:
    a control server having at least one processor configured to:
        obtain data about malicious elements of web pages, wherein the malicious elements include at least one of scripts and forms;
        transform the obtained data into at least one N-dimensional vector, wherein each coordinate of the vector represents at least one of a number of operators in the scripts or forms and a number of eval operators;
        create at least one cluster based at least on a set of allowable values of the coordinates of vectors for a malicious element or a group of malicious elements in N-dimensional space; and build the statistical model of the malicious elements of the web page based on the created at least one cluster, wherein the statistical model is at least for scripts of the web page and/or forms of the web page.

8. The system of claim 7, the processor further configured to:

receive data from one or more user devices, the data having been gathered using scripts configured to be executed by the one or more user devices;

refine the statistical model of the malicious elements based of the data received from the one or more user devices.

9. The system of claim 8, wherein the script to be executed by the user device is inserted by the node located between the user device and the web server sending a web page to the user device, wherein the script is inserted within the web page presented to the user device.

10. The system of claim 8, wherein the user devices transmit the data gathered by executing the scripts in raw format.

11. The system of claim 7, wherein the data about the malicious elements of web pages is obtained from a database that contains results from antivirus scans.

12. The system of claim 7, wherein the data about the malicious elements of web pages is obtained from a repository containing copies of known malicious software.

13. A non-transitory computer readable medium storing thereon computer executable instructions for building statistical models of malicious elements of web pages, including instructions for:

obtaining, by a control server, data about malicious elements of web pages, wherein the malicious elements include at least one of scripts and forms;

transforming, by the control server, the obtained data into at least one N-dimensional vector, wherein each coordinate of the vector represents at least one of a number of operators in the scripts or forms and a number of eval operators;

creating, by the control server, at least one cluster based at least on a set of allowable values of the coordinates of vectors for a malicious element or a group of malicious elements in N-dimensional space; and building, by the control server, the statistical model of the malicious elements of the web page based on the created at least one cluster, wherein the statistical model is at least for scripts of the web page and/or forms of the web page.

14. The non-transitory computer readable medium of claim 13, the instructions further comprising instructions for:

receiving, by the control server, data from one or more user devices, the data having been gathered using scripts configured to be executed by the one or more user devices;

refining, by the control server, the statistical model of the malicious elements based of the data received from the one or more user devices.

15. The non-transitory computer readable medium of claim 14, wherein the script to be executed by the user device is inserted by the node located between the user device and the web server sending a web page to the user device, wherein the script is inserted within the web page presented to the user device.

16. The non-transitory computer readable medium of claim 14, wherein the user devices transmit the data gathered by executing the scripts in raw format.

17. The non-transitory computer readable medium of claim 13, wherein the data about the malicious elements of web pages is obtained from a database that contains results from antivirus scans.

18. The non-transitory computer readable medium of claim 13, wherein the data about the malicious elements of web pages is obtained from a repository containing copies of known malicious software.

\* \* \* \* \*